United States Patent [19]
Murphy

[11] 3,874,336
[45] Apr. 1, 1975

[54] WALL AQUARIUM
[75] Inventor: Vivian G. Murphy, Arvada, Colo.
[73] Assignee: The Raymond Lee Organization, Inc., New York, N.Y. ; a part interest
[22] Filed: Oct. 19, 1973
[21] Appl. No.: 407,861

[52] U.S. Cl. .................................................. 119/5
[51] Int. Cl. ........................................... A01k 64/00
[58] Field of Search .................................... 119/5, 3

[56] References Cited
UNITED STATES PATENTS

| 22,019 | 11/1858 | Davis | 119/5 |
| 31,040 | 1/1861 | Shlarbaum | 119/5 |
| 2,879,742 | 3/1959 | Morrill | 119/5 |
| 3,119,371 | 1/1964 | Zuckerman | 119/5 |
| 3,664,301 | 5/1972 | Morrill | 119/5 |

Primary Examiner—Hugh R. Chamblee
Attorney, Agent, or Firm—Howard I. Podell

[57] ABSTRACT

A wall mountable aquarium formed of transparent plastic which serves as a fish bowl. The unit is formed of a flat section of material adaptable to hanging alongside of a wall, to which a convex section of transparent plastic sheet is bonded along the sides and bottom of both sections.

3 Claims, 5 Drawing Figures

PATENTED APR 1 1975  3,874,336

WALL AQUARIUM

SUMMARY OF THE INVENTION

My invention is a wall mountable fish bowl.

An advantage of my invention is that this fish bowl may be conveniently hung on a wall to provide optimum location of the aquarium with elimination of the conventional aquarium base or table.

The device is formed of a flat sheet of material adaptable to lying along a flat wall and bonded along its sides and bottom to a convex sheet of transparent plastic.

BRIEF DESCRIPTION OF THE DRAWING

The objects and featues of the invention may be understood with reference to the following detailed description of an illustrative embodiment of the invention, taken together with the accompanying drawing in which.

DESCRIPTION OF THE PREFERRED EMBODIMENT

Figure 1:
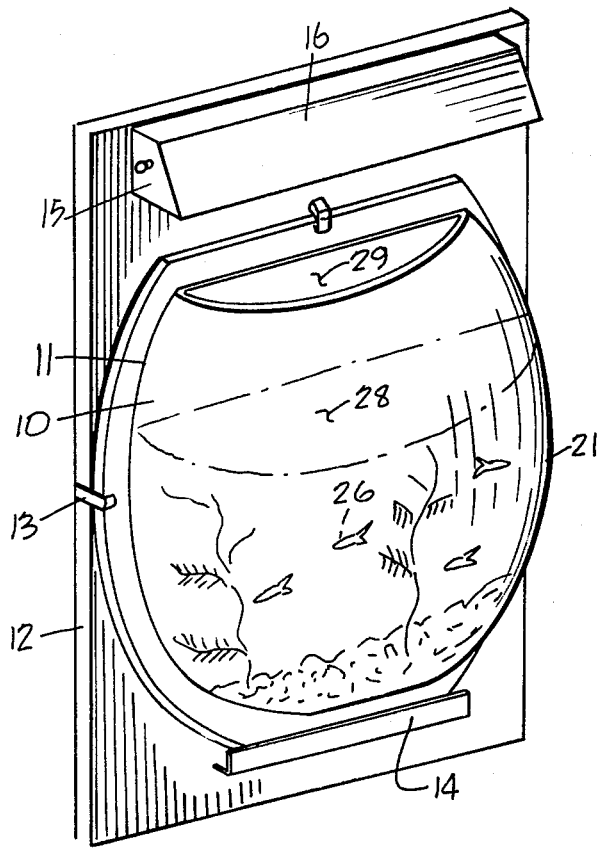
FIG. 1 illustrates a perspective view of the invention.
Figure 2:
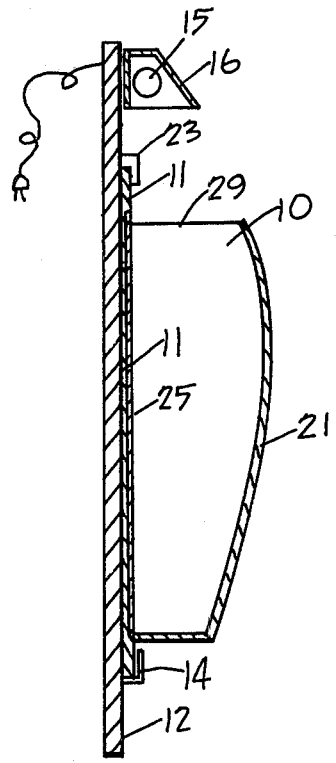
FIG. 2 illustrates a side sectional view of the invention.
Figure 3:
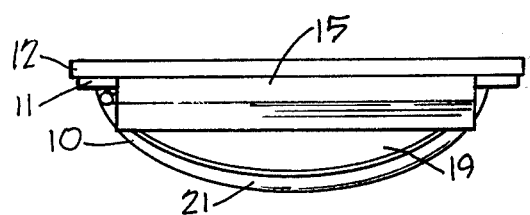
FIG. 3 illustrates a top view of the invention.

Turning now descriptively to the drawing, in which similar reference characters denote similar elements throughout the several views, FIGS. 1-3 show a wall mounted fish bowl 10 formed of a flat side panel 11 and a convex transparent side panel 21 that are bonded together. The exterior of the flat side panel 11 of the bowl 10 rests, in use, against a vertical wall 12 being held in place by a bottom bracket 14, side clips 13 and top clip 23 which are each fastened to the wall 12 and bent over the edges of flat side panel 11 of the bowl 10. A lamp unit 15 with a reflector housing 16 may be mounted to wall 12 above the bowl 10.

The flat side panel 11 may be transparent and finished on one surface 25 with mirror surface to reflect the view of the fish 26, swimming in the water 28 of the bowl 10, through exterior convex side panel 21. The convex side panel 21 is open at the top section 29 for addition or removal of material to the interior of the bowl.

Figure 4:
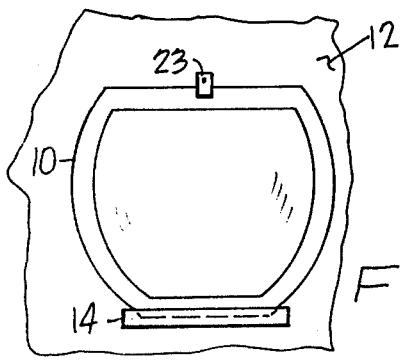
FIG. 4 illustrates a front view of the invention attached to a wall.

As shown in FIG. 4, the bowl 10 may be slidably mounted by a top bracket 23 and a bottom bracket 14 so that the bowl 10 may be removed from the wall by sliding the bowl laterally with respect to the wall 12 and with brackets 23 and 14.

Figure 5:
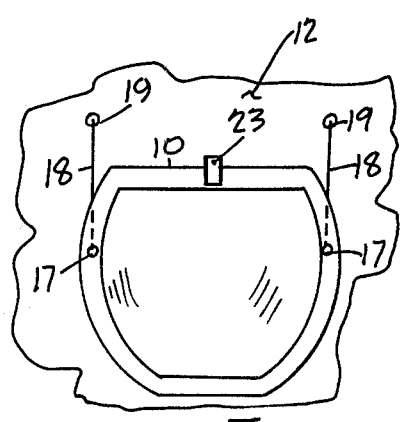
FIG. 5 illustrates a front view of the invention attached to a wall in an alternate manner.

Alternately, as shown in FIG. 5, the bowl 10 may be hung by wires 18 which are each fastened at one end to hole 17 near a side edge of flat side panel 11 of the bowl with each wire 18, at its other end, fitted to a wall fastener 19. A top bracket 23 fastened to the wall and over the top edge of the flat side panel 11 holds the bowl 10 parallel to the vertical wall 12.

Since obvious changes may be made in the specific embodiment of the invention described herein, such modifications being within the spirit and scope of the invention claimed, it is indicated that all matter contained herein is intended as illustrative and not as limiting in scope.

Having thus described my invention what I claim as new and desire by Letters Patent of United States is:

1. A fishbowl adaptable for mounting against a vertical surface, formed of a flat panel bonded to a transparent convex shaped panel, with an opening provided in the top section of the convex panel, said flat panel extending beyond the perimeter of the juncture of the convex panel to the flat panel, to form a border section of the fishbowl, together with a mounting frame in which the fishbowl is detachably retained, said mounting frame incorporating a flat surface, of equal or greater length and width than the maximum length and width of the said flat panel of the fishbowl, with clip members fitted on said mounting frame which fasten about the edges and over the front face of the flat panel of the fishbowl.

2. The combination as recited in claim 1 in which the clip members are located to engage a section of the top edge, bottom edge and one side edge of the flat panel of the fishbowl when the fishbowl and flat surface of the mounting frame are oriented in the vertical position, so as to permit sliding of the fishbowl sidewise relative to the mounting frame for removal of the fishbowl from said mounting frame or replacement of the fishbowl in said mounting frame.

3. The combination as recited in claim 2 in which a lamp unit is mounted on the top border of the mounting frame, so as to illuminate the attached fishbowl.

* * * * *